United States Patent [19]

Rabinowitz

[11] 4,176,291
[45] Nov. 27, 1979

[54] STORED FIELD SUPERCONDUCTING ELECTRICAL MACHINE AND METHOD

[75] Inventor: Mario Rabinowitz, Menlo Park, Calif.

[73] Assignee: Electric Power Research Institute, Inc., Palo Alto, Calif.

[21] Appl. No.: 801,241

[22] Filed: May 27, 1977

[51] Int. Cl.² ............................................... H02K 9/00
[52] U.S. Cl. ........................................ 310/52; 310/10; 310/261
[58] Field of Search ...................... 310/10, 264, 40, 52, 310/261, 265; 336/DIG. 1

[56] References Cited

U.S. PATENT DOCUMENTS

| | | | |
|---|---|---|---|
| 3,564,307 | 2/1971 | Kawabe | 310/10 |
| 3,679,920 | 7/1972 | MacNab | 310/10 |
| 3,816,780 | 6/1974 | Smith | 310/52 |
| 3,891,875 | 6/1975 | Laskaris | 310/40 R |
| 3,956,648 | 5/1976 | Kirtley | 310/40 |
| 3,983,427 | 9/1976 | Ulke | 310/40 R |
| 3,991,333 | 11/1976 | Laskaris | 310/52 |
| 4,020,371 | 4/1977 | Gillet | 310/52 |

OTHER PUBLICATIONS

Rabinowitz, "Multiple Mag. Field Trapping by Superconductors", IEEE Trans. on Magnetics, Mag. 11, 548; 3/75.
Rabinowitz, "A Very Incomplete Meissner Effect", Nuove Cimento, vol. 7, No. 1, (1973).
Garwin et al., "Perm. Multipole Mag. Fields Stored in Supercond's", Appl. Phys. Lett's., vol. 22, No. 11, 599, (1973).

Primary Examiner—R. Skudy
Attorney, Agent, or Firm—Flehr, Hohbach, Test, Albritton & Herbert

[57] ABSTRACT

Method and apparatus are provided for a stored magnetic field in a superconducting, rotating electrical machine. The apparatus includes a cylinder of superconductive material in which a magnetic field is trapped. The trapped magnetic field forms a magnetic circuit with an armature winding in the machine. The apparatus further includes means for generating a magnetic pattern field in the superconductive cylinder and means for cooling the cylinder so that a magnetic field can be trapped therein. The apparatus has application in both motors and generators and in both rotating and stationary magnetic fields used therein.

35 Claims, 11 Drawing Figures

FIG_1

FIG_2

FIG_3

FIG_4

ARMATURE COIL PULSE GENERATOR

FIG_6

FIG_8

FIG_5

FIG_7

FIG_12

FIG_9

FIG_14

FIG_13

FIG_15

FIG_10

FIG_11

STORED FIELD SUPERCONDUCTING ELECTRICAL MACHINE AND METHOD

BACKGROUND OF THE INVENTION

1. Field of the Invention

This invention generally relates to superconducting electrical machines and, more particularly, to apparatus and methods for generating a magnetic field therein.

2. Description of the Prior Art

The concept of a superconducting AC generator for utility power system applications has been of interest for a number of years, but it has not been until recently that definitive feasibility studies have been made. Although these studies are not yet complete, it appears that among the advantages to be accrued with such a machine will be reduced size and weight, higher efficiency, lower capital cost, and greater system stability. In addition, a major opportunity afforded by a superconducting generator is the potential for generation at full-line voltage, i.e. 230 kV, 500 kV, and higher. Operation at full-line voltage would totally remove the necessity for a step-up transformer and would result in a simplification of the central station, a potential increase in reliability, and savings in both capital and operating expenses.

As far as the Applicant has been able to determine, the first work reported in the open literature on superconducting alternators was conducted by Woodson, Stekly, Halas, Hatch, and Hoppie in 1966. This work is reported in IEEE Trans. Power Apparatus and Systems, PAS 85, 264, by H. H. Woodson, Z. J. J. Stekly, and E. Halas, 1966; and IEEE Trans. on Power Apparatus and Systems, PAS 85, 274, by Z. J. J. Stekly, H. H. Woodson, A. M. Hatch, L. O. Hoppie, and E. Halas, 1966. A 1964 AVCO research report 181 by Stekly and Woodson establishes an even earlier date. They constructed and successfully operated an alternator using a fixed superconducting field coil, and a rotating, 300° K. armature with slipring connections.

The first rotating superconducting field coil was shown to be practical in 1971 by an MIT group. This work is reported in IEEE Trans. Power Apparatus and Systems, PAS 90, 611, by P. Thullen, J. C. Dudley, D. L. Greene, J. L. Smith, Jr., and H. H. Woodson, 1971. The machine was operated at 45 kVA as a synchronous condenser. These experiments demonstrated that an adequately stranded and transposed armature can take advantage of the high field produced by the rotor with acceptably low eddy-current and circulating current losses, and without needing iron to couple the flux from the rotor to the armature. This machine achieved 3.2 T in the rotating state.

A second machine, rated at 3 MVA, was built, tested, and operated on Nov. 25, 1975, for about 22 minutes as a synchronous condenser on the Cambridge grid. This machine had a rotating superconducting field coil inside a normal stationary armature.

In addition, Westinghouse has built and operated a 5 MVA superconducting generator, as well as a lightweight 12,000 rpm, 4 pole superconducting rotor for airborne applications. This work is reported in Proc. 1972 Appl. Superconductivity Conf., IEEE Pub. 72CHO682-5-TABSC, p. 151, C. J. Mole, H. E. Haller, and D. C. Litz; and Proc. 1974 Appl. Superconductivity Conf., IEEE Trans. on Magnetics, MAG 11, 640, by J. H. Parker, Jr., R. D. Blaugher, A. Patterson, P. D. Vecchio, and J. L. McCabria, 1975.

At the present time there are several problems in the design of an ordinary rotating superconductor. When the superconductor is the field coil of an electrical machine, there is the problem of conductor motion and training. If the field coil is stationary, the magnetic field at the presently comtemplated levels of 5—6 Tesla is sufficient to cause conductor motion. If the field coil is rotating, the centrifugal force is greater than the magnetic force and the two forces combine to cause motion of the superconducting strands in the rotor. Conductor motion, when it occurs, reduces the critical current density in the machine as well as increases the power loss. At cryogenic temperatures conductor motion represents a substantial loss in the refrigeration cycle. Further, if conductor motion is unrestrained, it can dissipate so much energy that the superconductor is driven normal.

The second problem in the design of an ordinary superconducting coil is the need for stabilization of the electrical machine from the possibility of magnetic, thermal, mechanical and electrical disturbances. Any one of these disturbances can severely degrade the performance of the superconductor. In addition, regenerative degradation can lead to catastrophic quench of superconductivity.

One of the crucial properties of superconductivity is the fact that a magnetic field is expelled from the bulk of a superconductor in a transition from the normal to the superconducting state. This effect is named the Meissner effect after its discoverer. However, contrary to the expectation from the Meissner effect, it has been shown that any field configuration from low to high field strength can be trapped in both a Type I and Type II superconductor. The fidelity of the trapped field to the original field has been shown to be quite high. Dipole, quadrupole, and sextupole magnetic fields have been permanently trapped traversely to the axis of solid, hollow, and split-hollow superconducting cylinders. This work is reported in IEEE Trans. on Magnetics, MAG 11, 548, by M. Rabinowitz, 1975; Nuovo Cimento Letters 7, 1, by M. Rabinowitz, E. L. Garwin, and D. J. Frankel, 1973; and Appl. Phys. Letters 22, 599, by E. L. Garwin, M. Rabinowitz, and D. J. Frankel, 1973.

Objects and Summary of the Invention

It is an object of the present invention to reduce the size and weight, to increase the efficiency, to lower the capital cost, and to provide greater stability in a superconducting electrical machine.

A further object of the present invention is to increase the magnetic flux density (B) in a superconducting electrical machine and thereby increase the output power of the machine. The power density of either an electrical generator or a motor is proportional to the square of the average flux density (B) at the armature.

An additional object of the present invention is to eliminate conductor motion and training in the rotor of a superconducting electrical generator.

Still a further object of the present invention is to incorporate A-15, beta-tungsten structure, superconductors into electrical rotating machine. These materials not only permit operation at much higher levels of magnetic flux density (B) but also permit more stable operation at the same field values as wound coil rotors using lower critical parameter materials. It should be understood that these A-15 materials are so brittle that they are not easily fabricated into wire and consequently have not heretofore been used in wirewound rotors.

A further object of the present invention is to trap a magnetic field for use in a superconducting electrical machine by using the armature coils of that machine.

Another object of the present invention is to eliminate all electrical leads to the rotor of a superconducting generator. These leads heretofore have been lossy since they are refrigerated and have required complex superconducting-to-normal transitions, and slipring assemblies.

Additional objects and features of the invention will appear from the following description in which the preferred embodiments have been set forth in detail in conjunction with the accompanying drawings.

BRIEF DESCRIPTION OF THE DRAWINGS

FIGS. 5 and 7 are diagrammatic end elevational views of simple cylinders for trapping a magnetic field. In FIG. 5, the cylinder is unslotted and in FIG. 7 the cylinder is slotted.

DESCRIPTION OF THE PREFERRED EMBODIMENTS

Overview

Figure 1:
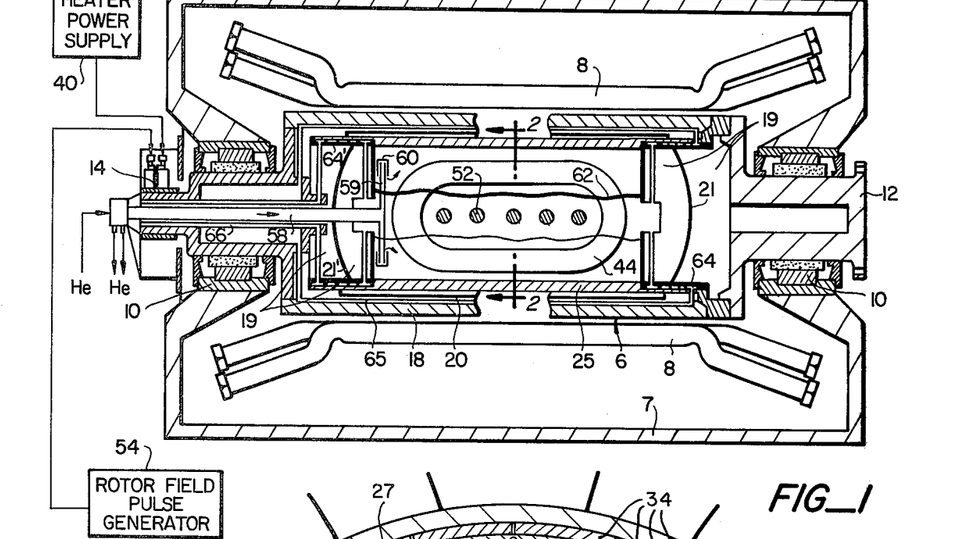
FIG. 1 is a diagrammatic, side elevational view of a superconducting electrical generator having a stored magnetic field in the rotor according to the present invention.
Figure 2:
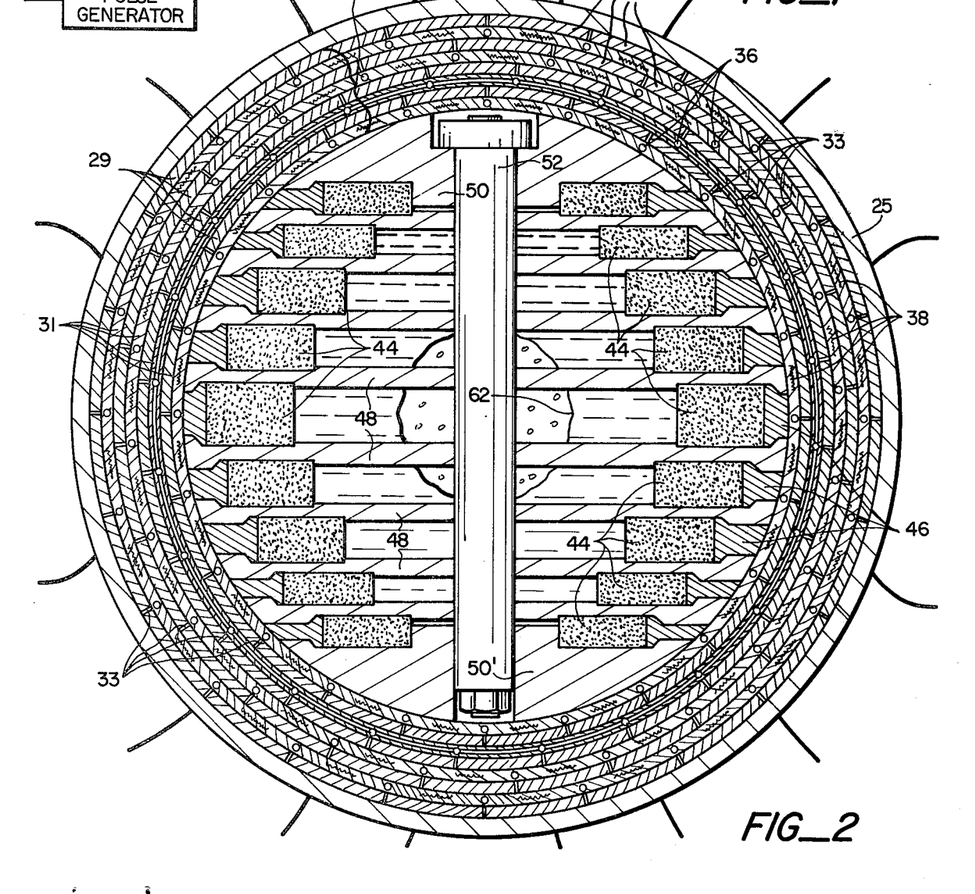
FIG. 2 is an end elevation of a portion of the rotor of FIG. 1, said elevation being taken in section along line 2—2, FIG. 1.
Figure 3:
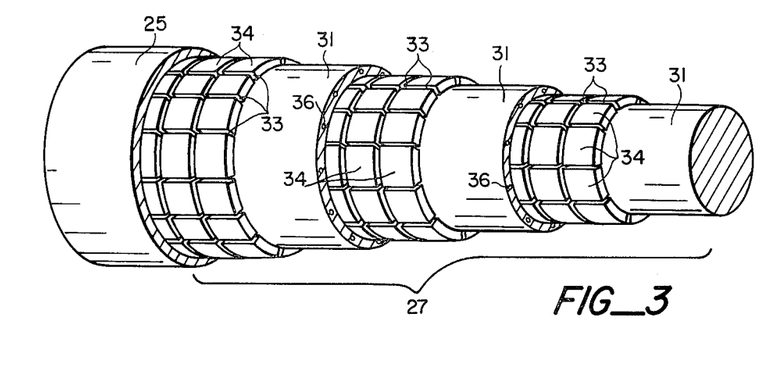
FIG. 3 is an isometric view of a portion of the rotor of FIG. 1, said rotor being broken away to illustrate the alternating cylindrical layers of superconductive material and thermally conductive material.
Figure 4:
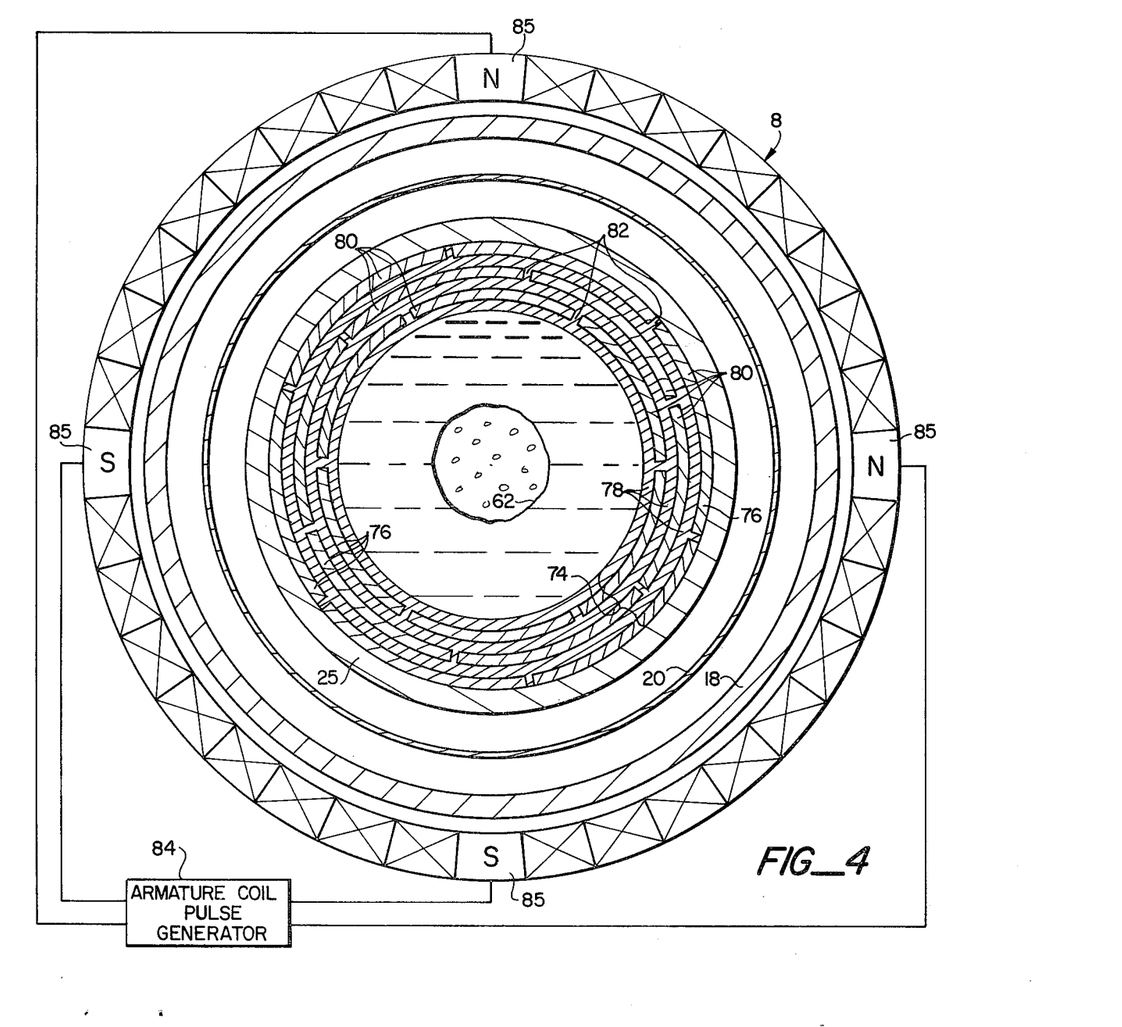
FIG. 4 is an end elevation, in section, of a alternative embodiment of a superconducting rotor and armature winding. A magnetic pattern field is developed by pulsing selected coils in the armature winding.
Figures 9, 12, 13, 14, 15:
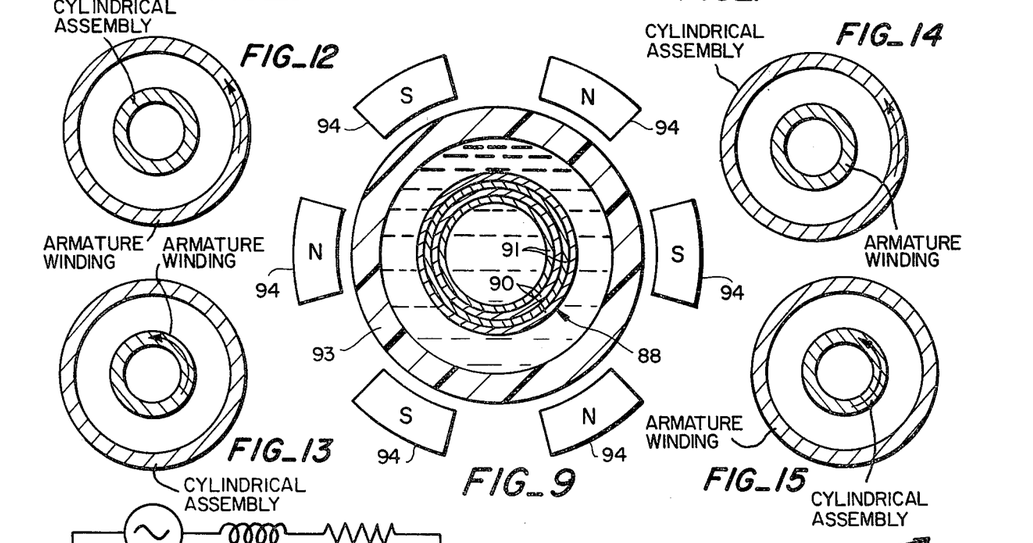
FIG. 9 is a diagrammatic, top plan view of a second alternative embodiment of a superconducting rotor for an electrical machine. The rotor is removed from the machine and a pattern field is developed by magnets located around the outside of a Dewar flask.
FIGS. 12-15 are diagrammatic end elevational views of armature windings and cylindrical assemblies.

The present invention contemplates a method and apparatus for providing a magnetic field in a superconducting rotating electrical machine. The apparatus includes a cylinder of superconductive material adapted for trapping a magnetic field therein. This cylinder can be incorporated into both motors and generators and can be both rotated and stationary with respect to the armature of the machine. FIGS. 1-3 illustrate the superconductive cylinder incorporated into the rotor of a large superconducting synchronous generator. The magnetic field trapped in the cylinder is developed by coils located in the rotor. FIG. 4 shows an alternative embodiment of the rotor wherein the magnetic pattern field is developed by pulsing selected windings in the armature coil. FIG. 9 depicts a second alternative embodiment of the superconductive cylinder. The cylinder is removable from the machine and the magnetic field is trapped exterior of the machine.

Construction of the Embodiment of FIGS. 1-3

More specifically, FIG. 1 illustrates a superconducting synchronous generator that includes a rotor 6 that is supported by two bearings 10 and a housing 7. The rotor turns within the armature winding 8 of the machine. The rotor is turned by a turbine (not shown) attached to the coupling 12.

The rotor 6, FIG. 1, is cooled by a flow of liquid helium. The rotor includes an electromagnetic shield 18 that also serves as a vacuum envelope. The interior of the rotor at points 19 is permanently evacuated in order to insulate the rotor from other components of the generator operating at ambient temperature. The electromagnetic shield also screens the superconducting winding from nonsynchronous components of the magnetic fields produced by unbalanced or transient currents in the armature winding 8. Inside of the electromagnetic shield is a thermal radiation shield 20 which is cooled to an intermediate temperature of between 80° K. and 100° K. This shield absorbs thermal radiation from the ambient temperature electromagnetic shield 18 and reradiates it at a lower temperature. The rotor is also protected at its ends by two thermal radiation shields 21, 21'.

Inside of these shields is a torque tube 25 which transmits the torsional forces from the rotor through the coupling 12 to the turbine (not shown). The torque tube is illustrated in FIG. 2 in end elevation. The torque tube houses a cylindrical assembly 27 for trapping a magnetic field and for forming a magnetic circuit with the armature winding 8, FIG. 1. The cylindrical assembly 27 comprises a plurality of alternating layers of superconductive material 29 and high thermally and electrically conductive material 31 such as copper or aluminum. For brevity the high thermally and electrically conductive material 31 is hereinafter referred to as TEC material. Each layer of the assembly is co-axial and has a cylindrical shape.

Referring to FIGS. 2 and 3, each cylindrical layer 29 of superconductive material is preferably fabricated from a Type II material having a high $H_{C2}$. In the preferred embodiment these cylindrical layers are fabricated from a A-15, beta-tungsten structure, superconductive material. Examples of these materials are listed below along with their critical temperatures ($T_c$) and the values of second critical field at 4.2° K. in Table I.

TABLE I

| Superconductor | $T_c$ °K. | $H_{C2}$ (at 4.2° K.) Tesla |
|---|---|---|
| Nb$_3$Ge | 23 | 37 |
| Nb$_3$(Al,Ge) | 21 | 41 |
| Nb$_3$Ga | 20.3 | 33 |
| Nb$_3$Al | 18.9 | 30 |
| Nb$_3$Sn | 18.1 | 22 |
| V$_3$Ga | 15–16.8 | 23 |
| PbMo$_{5.1}$S$_6$ | 14.6 | 50 |

By contrast, NbTi, the wire superconductor most used today has a $T_C$ of only 9.5° K. and $H_{c2}$ of only 12T. Although multifilamentary Nb$_3$Sn wire is not commercially available, its long-term performance in wire form remains to be demonstrated.

It should be appreciated that the A-15, beta-tungsten structure, superconductors are brittle as are many other high $H_{c2}$ materials. However, because of the high $H_{c2}$ and the concomitantly high critical current density obtainable with these materials, they are quite desirable for high field electromagnetics. Heretofore these brittle materials have not been used in superconducting machines because of the difficulty in fabricating these materials into coils. Incorporation of these materials into the cylindrical assembly 27 not only permits operation of the generator at higher levels of magnetic flux density (B) but also permits more stable operation of the machine at the same field values as comparable wound coil rotors.

Each layer 29, FIG. 2, of superconducting material is segmented into elements 34 in FIG. 3 that form a grid 33. The stored magnetic field in the cylindrical assembly 27 does not require continuity of the superconductor or a monolithic structure. Each cylinder is segmented in order to minimize hysteresis and other power losses due to time varying harmonics that penetrate the shields 18, 20, FIG. 1. These harmonics are generated by time varying magnetic fields that are fed back from the armature winding 8 and which cause the time varying eddy-currents.

The gap between each element 34, FIG. 3, should be as small as possible in order to obtain high fidelity between the stored field and the pattern field as described below. The size of each element and the number in each layer is determined by optimizing between the overall current density and the required duration of the stored field. As the size of each grid element decreases, the overall current density decreases. However, as the number of elements increases and as their size decreases, the losses are decreased, and the field takes longer to decay.

It should be noted in FIG. 2 that the gaps between the superconducting elements 34 do not overlap between layers. This staggering of the gaps between layers reduces the effect of any fringing that occurs between the elements. If the gaps were to line up along a radius of the rotor, the fringing would perturbate the magnetic field seen by the armature winding 8. In addition, although the alternating layers of superconducting materials 29 are divided by a grid 33 into a plurality of elements 34, these alternating layers are displaced with respect to each other so that the entire rotor surface is covered by a superconductor even though this superconductor is discontinuous in any one layer. It should further be noted that the cylindrical assembly 27, FIG. 2, is fabricated from a plurality of superconducting co-axial cylinders in order to increase the density of this material in the rotor while permitting substantial segmentation into elements 34.

The cylinders of superconductive materials 29, FIG. 2, alternate the monolithic cylindrical layers of thermally and electrically conductive (TEC) material 31. These layers of TEC material can be fabricated from either high conductivity copper or aluminum. The layers of superconductive materials 29 generally have poor thermal conductivity, and the high thermal conductivity of the TEC material 31 provides a heat transfer medium for the cylindrically assembly. The high electrical conductivity of the TEC material 31 also retards flux flow. Each layer of TEC material also contains a plurality of channels 36 through which liquid helium flows. Helium flows through the grid 33. This flow of liquid helium refrigerates the superconductor and is part of the flow through the rotor described in detail below. Further, each layer 31 of TEC material contains a plurality of heaters 38 which are energized by a rotor heater power supply 40, FIG. 1. These heaters are used to raise the temperature of the cylindrical assembly and drive the superconducting materials 29 to normal conductivity when the stored magnetic field is changed. This process is described in detail below.

Referring to FIG. 2, the cylindrical assembly 27 houses nine normal or superconducting coil modules 44. Each module 44 is racetrack shaped as illustrated in FIG. 1. The coil modules 44 form a magnetic pattern coil in the rotor and are energized by a rotor coil pulse generator 54, FIG. 1. The pattern coil generates a magnetic pattern field in the superconducting cylinders 29 and the magnetic field is stored therein in a manner described below. In operation, these coil modules are pulsed on for a short time to provide a high magnetic flux density to the cylindrical assembly 27.

Referring to FIG. 1, the rotor 6 is cooled by a flow of liquid helium. Saturated liquid helium is delivered to a central supply tube 58 from a liquefier or a supply Dewar flask (not shown). Liquid helium along the axis of rotation of the rotor into the hollow portion of the torque tube 25. The liquid helium is distributed in the rotor by a radial supply tube 59 and a level control monitor 60. Liquid helium is also distributed through the TEC material 31 via the channels 36, FIG. 2.

When the rotor turns, the centrifugal force on the rotor causes the liquid helium to assume the shape of a cylinder having a cylindrical cross section, FIG. 2. The lighter weight helium vapor becomes centered about the axis of rotation of the rotor. The cylindrically shaped surface between the liquid and vapor is indicated by reference numeral 62.

In steady-state operation the liquid helium boils as a result of the heat transferred into the cold region of the rotor. Two separate streams of boil-off vapor are removed from the rotor. One stream passes through a series of spiral flow channels 64, then through a passage 65 that runs across the inner side wall of the electromagnetic shield 18, and thereafter through the exhaust tube 66 which is concentric with the central supply tube 58. The other stream of vapor passes through a second plurality of spiral flow channels 64' which also connect to the concentric exhaust tube 66. The warm helium vapor thereafter flows out of the generator and is returned to the liquefier (not shown).

Operation of the Embodiment of FIGS. 1-3

In general, the superconducting generator illustrated in FIGS. 1-3 operates in the same manner as any large, synchronous, AC generator. A magnetic field generated in the rotor forms the magnetic circuit with the armature winding, and when the rotor is turned by a source of mechanical power, electrical current is produced in the armature winding. In FIG. 1, the magnetic circuit between the armature winding 8 and the rotor 6 is formed by a magnetic field that is stored or trapped in the cylindrical assembly 27, FIG. 2, as shown, a dipole magnetic field is trapped in the superconductor in a direction lateral to the axis of rotation of the rotor. Quadrupole, and higher order multipoles may also be stored.

The components within the torque tube 25, FIG. 2, and the shields 18, 20, and 21, FIG. 1, are cooled by a flow of liquid helium through the rotor. The overall flow through the generator is described in detail above. The liquid helium in the rotor also flows through the channels 36, FIG. 2, in the layers of TEC material 31 and in the grid 33. This flow of helium in combination with the heat condution of the TEC material 31 refrigerates the layers of superconductive materials 29 during operation.

The process of storing a magnetic field in the rotor is commenced when the rotor is above the critical temperature of the superconductor and the superconductor has normal conductivity. The coil modules 44, FIG. 2, located inside the cylindrical assembly 27 are energized by the rotor pulse generator 54, FIG. 1. These coil modules form a pattern coil that generates a magnetic pattern field in the generator. After the pattern field is established, the superconductor is cooled in the pattern field to a temperature below its transition temperature. After the superconductor has cooled to below its critical temperature, the coil modules are de-energized, and the pattern field remains trapped in the superconductor.

The trapped magnetic field has a high fidelity to the pattern field. Using the above process, the magnitude of the magnetic flux density trapped in the superconductor can be controlled by varying the magnitude of the magnetic flux density in the pattern field. If a large magnetic field is to be stored in the superconductor, a correspondingly large magnetic flux density is produced in the coil modules 44 by the pulse generator 54. Since the coil modules 44 are on only a very short time, a very high magnetic flux density can be developed in the rotor. It has been observed that a cylindrical assembly of the type described herein can store, using this process, a magnetic field in the superconductor of up to about one-half $H_{c2}$.

The magnetic field trapped in the rotor is essentially fixed and the magnetic flux density (B) is constant. If there is a requirement to change the magnetic flux density of the field or if the field has decayed due to losses and needs to be restored, the superconductive layers 29 are warmed back to the normal state and the trapping process described above is repeated. The heaters 38, FIG. 2, located in the TEC material 31 are energized by the heater power supply 40, FIG. 1. These heaters warm the superconductive layers 29 to a temperature above the critical temperature and the magnetic field previously stored therein is untrapped. Thereafter, the heaters 38 are de-energized and the winding modules 44 are pulsed by the pulse generator 54 to develop a new pattern field in the superconductor. The output of the pulse generator is adjusted to provide the desired terminal voltage from the generator.

There are several explanations for the existence of the trapped flux in the superconductor. One explanation postulates an inhomogeneity in the form of a multi-connected system of thin elements having critical fields above that of the majority of material within the superconductor. The high critical fields of these connected filaments, known as a Mendelssohn sponge, can be caused by strains, impurity concentration gradients or lattice imperfections. If the cylindrical assembly 27, FIG. 2, is placed in a large magnetic field which is subsequently reduced, the anomalous regions will become superconducting first, trapping flux by virtue of their connectivity.

A second explanation of flux trapping is made analogously by assuming a distribution of transition temperatures.

A third explanation has been proposed by the Applicant in the Nuovo Cimento article cited above. The process of cooling a cylindrical superconductor proceeds from the outside and, coupled with low bulk thermal conductivity, initiates the superconducting transition at the outside of the cylinder. The superconductor is thereafter multiply-connected, which prevents flux in the internal macroscopic normal regions from escaping as these regions shrink to microscopic size.

A fourth explanation also proposed by the Applicant is the most general, and shows that a superconductor can hardly avoid becoming multiply-connected. For any magnetic field below the value of the critical field at a given bath temperature, the superconductor must enter the intermediate state (due to magnetic field gradient) for Type I or the mixed state for Type II as the superconducting critical fields increase from zero at the transition temperature $T_c$ to their final values at the bath temperature. The slow and uniform cooling ensures nearly thermo-dynamic equilibrium, resulting in an almost uniform lattice of normal regions containing flux trapped within a network of multiply-connected superconductor. Similarly, when a superconductor is held below $T_c$ in a field above the critical magnetic field, as the external field is reduced, Type II superconductors must pass through the mixed state while Type I superconductors must pass through the intermediate state. Flux trapping takes place in both cases because the superconductor is multiply-connected.

The coil modules 44, FIG. 2, may be either superconducting or normal coils. Such coils will develp a very high pattern field because they can be pulsed on with a very large overcurrent compared to what they can carry in steady-state. The coil is cooled in the rotor by a flow of liquid helium and, consequently, even for normal conductors, has a very high conductivity. Thus, a coil of normal conductivity can be used to develop a pattern field of between 10 to 20 times the magnetic field commonly found in a steady-state field winding of equivalent size. Thus, the magnetic field trapped by the cylindrical assembly 27 is substantially higher than fields heretofore available.

Construction and Operation of the Embodiment of FIG. 4

FIG. 4 illustrates an end elevation a rotor and ar armature of a large superconducting AC generator. The pattern field is generated by pulsing selected windings of the armature winding 8. The magnetic field is stored in the cylindrical assembly 74.

The rotor includes an electromagnetic shield 18, FIG. 4, a thermal shield 20 and a torque tube 25 that perform the same functions as the comparable components described above. The rotor also includes a cylindrical assembly 74 adapted for trapping a magnetic field therein. The cylindrical assembly has a plurality of alternating layers of superconductive material 76 and thermally and electrically conductive (TEC) material 78. Each layer of the assembly is co-axial and has a cylindrical shape. When a magnetic field is trapped in the cylindrical assembly, the field forms a magnetic circuit with the armature winding 8 of the generator.

The superconductive cylinders 80, FIG. 4, are fabricated from a Type II material and, in the preferred embodiment, from a material selected from Table I listed above. Each layer of the superconductive material is divided by a grid into a plurality of elements 80. As described above, the size and shape of the elements are determined by optimizing between the maximum current density and the duration of the field. The layers of superconductive material 76 are cooled by thermal conduction with the TEC cylindrical layers 78. These layers are in turn refrigerated by a flow of liquid helium through the rotor. The elements 80 of superconductive material are separated by narrow webs 82 of TEC material. The webs connect the layers of TEC material together. The webs also support the cylindrical assembly and provide a heat transfer medium for the heat generated in the superconductive elements 80.

In the embodiment of FIG. 4, the magnetic pattern field is generated by energizing selected windings in the stator of the machine. In the preferred embodiment the pattern field is generated by pulsing the windings in the armature winding 8. To trap a quadrupole magnetic field in the rotor, four opposite windings 85 in the armature winding are pulsed by an armature coil pulse generator 84.

As described above, a magnetic field is trapped in the cylindrical assembly 74, FIG. 4, by energizing the armature windings 85 when the superconductor is above its critical temperature and is normally conductive. Thereafter, the superconductor is cooled below its transition temperature while remaining within the pattern field. When the transition temperature is passed, the pulse generator 84 is de-energized and the magnetic field remains trapped in the cylindrical assembly.

It is contemplated within the scope of the present invention to trap a magnetic field while the rotor is turning. The pulse generator 84 is connected to a plurality of the windings and is clocked to set up a traveling wave in synchronization with the speed of the rotor. The pattern field thereby rotates at the same rate as the rotor and a magnetic field is trapped in the superconductor in the same manner as described above.

It should be noted that when the pattern coil is located within the stator of an electrical machine and the magnetic field is trapped in the rotor, the rotor no longer requires any electrical connections thereto. Heretofore, such electrical connections have been difficult to refrigerate. In addition, superconducting rotor windings have required complicated and costly sliprings which are not necessary in the embodiment of FIG. 4.

Construction and Operation of the Embodiment of FIG. 9

The embodiment of FIG. 9 is adapted for trapping a field away from the electrical machine in which the magnetic field is used. In particular, the cylindrical assembly 88 is either stator or a rotor and comprises a plurality of alternating layers of superconductive material 90 and TEC material 91. The layers have a cylindrical shape and alternate in the manner described above. The layers form a hollow, cylindrical, multi-layered shell that is lightweight and can be used for short-term, high-energy applications. The layers of superconductive material 90 are not divided into elements by a grid because the assembly is designed for only short-term use and the loss due to time varying eddy-currents is insignificant in the short term. The cylindrical assembly 88 is stored prior to operation and during field trapping in a Dewar flask 93 filled with liquid helium. The Dewar flask is surrounded by a plurality of magnets 94 which in the preferred embodiment generate a sextupole magnetic field.

In one application, the hollow shell 88, FIG. 9, may be used as a rotor in a generator to operate a high energy airborne laser. Prior to use, a magnetic field is trapped in the cylinder and then the cylinder is placed in cryogenic storage. When the rotor is needed, it is removed from the Dewar flask and inserted in the machine. It should be noted from the above Table I that Type A-15, beta-tungsten structure, superconductors have relatively high critical temperatures so that the transfer from the Dewar flask 93 to the generator is more easily effected than with a conventional superconductor.

A magnetic field can be stored in the cylindrical assembly 88, FIG. 9, by using the procedure described above in connection with FIGS. 1-3. In addition, the magnetic field can be trapped using the following alternative procedure. The cylindrical assembly 88 is first inserted into the Dewar flask 93 and cooled to a temperature below its transition temperature. Thereafter, the external magnetic field is established by energizing the magnets 94. In effect, the magnetic field is driven into the superconductor by exceeding the critical field $H_{c2}$. Next, the pattern field is turned off and a magnetic field is trapped within the cylindrical assembly 88.

This latter procedure contrasts with the procedure described above with FIGS. 1-3 in that there is no control over the field stored in the cylindrical assembly. Only the maximum field that can overcome the shielding limit of a superconductor is trapped.

General Considerations

The present invention contemplates storing a magnetic field in a superconducting shell which can be used in both generators and motors. Although quite different in their functions, generators and electric motors are essentially the same machine operated in inverse modes. A generator converts mechanical energy into electrical and when the process is reversed, the generator functions as a motor.

It should be understood that the magnetic field in a generator or motor is not intended to do work. The magnetic field of the rotor essentially does no work insofar as there is negligible time variation of the field. A magnetic field via the generator or motor serves only as a vehicle for converting mechanical power into electrical power or vice versa. The purpose of the magnetic field is to couple the mechanical energy into electrons in the armature or vice versa.

The following equation demonstrates that the static (in time) magnetic field does no work because the displacement, s, of the electric charge, q, is always at 90° with respect to the magnetic force, F.

$$\text{Work} = \int \vec{F} \cdot \vec{ds} = \int (q\vec{v} \times \vec{B}) \cdot (\vec{v}dt) = 0.$$

To avoid general confusion between motors and generators and the windings therein, the term stator as used herein means ny stationary winding in an electrical machine and the term rotor refers to the rotating part of the machine. The rotor turns relative to the stator. An armature or armature winding refers to the winding in an AC electrical machine that carries the major portion of the alternating current. Thus, the cylindrical assembly for trapping a magnetic field can be incorporated into either the stator or the rotor of an electrical machine. In addition, a magnetic pattern field can be generated from a pattern coil located in the rotor as illustrated in FIG. 2, or in the stator as illustrated in FIG. 4.

It should be noted in FIG. 4 that the armature winding is included within the stator.

Further, when the superconductor traps a magnetic field in the cylindrical assembly, the cylindrical assembly forms a magnetic circuit with the armature winding. The armature winding can be rotated relative to the cylindrical assembly and the cylindrical assembly can be located either inside of or around the outside of the armature winding as illustrated in FIGS. 12 and 13, respectively. In addition, the cylndrical assembly can be rotated relative to the armature and the armature can be located either inside of the cylindrical assembly and around the outside of the cylindrical assembly as illustrated in FIGS. 14 and 15, respectively.

It should also be understood that each of the above-described procedures for trapping a magnetic field can be used in either an electric generator or motor. In the procedure described in connection with FIGS. 1 and 3, the magnitude of the magnetic field trapped in the superconductor can be predetermined by adjusting the level of the pattern field. The procedure described in connection with FIG. 9, however, permits a magnetic field to be trapped in a superconductor without having to warm the superconductor back to normal conductivity if the superconductor is already cooled.

It should also be noted that the power density of either a generator or motor is proportional to the square of the average flux density (B) at the armature. When a A-15, beta-tungsten structure, superconductor is used, much higher magnetic fields can be generated than heretofore produced with prior art superconducting coils. The materials fabricated in these prior coils do not have as high a critical field as the A-15 superconductors. In addition, the A-15 superconductors permit operation of a superconducting electrical machine at much higher temperatures as evidenced by the critical temperatures listed in the above Table I. Operation at higher temperatures in turn means that less power is required for refrigeration of the superconductor.

Figure 5:
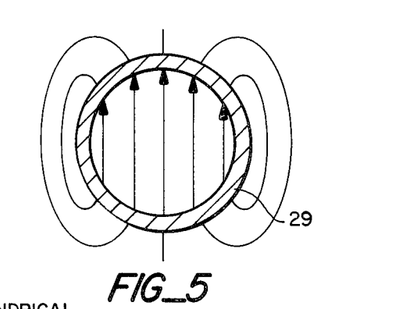
Figure 6:
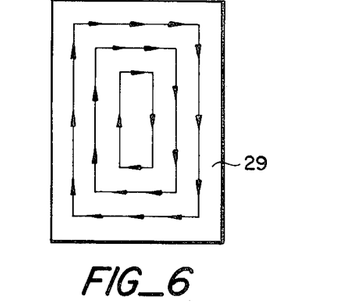
FIGS. 6 and 8 are top plan views of the cylinders of FIGS. 5 and 7, respectively.
Figure 7:
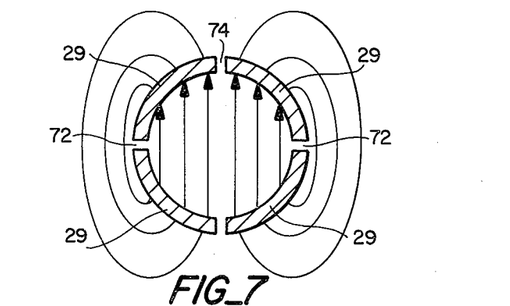
Figure 8:
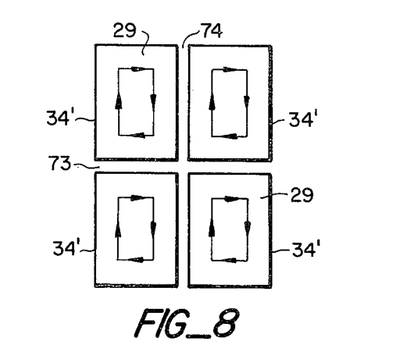

Referring to FIGS. 5-8, it can be seen that the induced current distribution in a single cylinder 70 of superconducting material is equivalently the same, whether the cylinder is monolithic or divided into a grid. FIGS. 5 and 6 illustrate the induced current distribution when the superconducting cylinder is not divided by a grid, and FIGS. 7 and 8 illustrate a superconducting cylinder when the cylinder is divided by a grid into four elements 34′. Where the cylinder is divided along its longitudinal axis at point 72, FIG. 7, the plane of the slit is perpendicular to the field and the induced current distribution is exactly the same with or without the slit. This is because in the un-slit cylinder, FIG. 5, there is no component of the current through the slit 72. When the slits 73, 74, FIG. 8, are parallel to the field, the presence of the slits does affect the current distribution as shown in FIG. 8. The slits 73, 74 split the distribution into four zones. However, the dipole moment of the two currents on either side of each slit is much smaller than the dipole moment of the currents on the sides of the cylinder, as illustrated in FIG. 6, by roughly the ratio of the slit width to the cylinder diameter. Thereafter, for distances away from the slit greater than the width of the slit, the remanent field either inside or outside of the cylinder is dominated by the outer currents and therefore is a dipole field to a good degree of approximation. As long as there is sufficient critical current density to produce flux trapping, i.e., a significant remanent field, the subdivision of the cylinder can be carried out and a dipole field can be maintained provided that the slit width becomes smaller as the number of elements 34′ is increased.

Figures 10, 11:
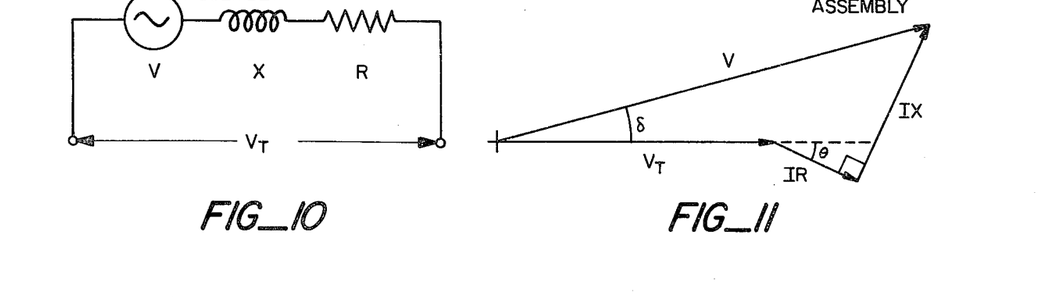
FIG. 10 is a schematic diagram of a steady-state equivalent circuit for an AC generator.
FIG. 11 is a steady-state voltage phasor diagram of the equivalent circuit of FIG. 10.

The terminal voltage $V_T$ of an AC generator is given by the following equation:

$$V_T = (IR\ tn\theta - IX)\sin\theta - \frac{IR}{\cos\theta} + [V^2 - (IX - IR\ tn\theta)^2\cos^2\theta]^{\frac{1}{2}}$$

where
- $I$ = Armature current
- $R$ = Armature resistance
- $\theta$ = Power factor angle
- $X$ = Synchronous reactance
- $V = -N(d\phi/dt)$ = Generated Voltage
- $\phi$ = Magnetic Flux
- $N$ = Armature turns The steady-state equivalent circuit for the AC generator is illustrated in FIG. 10 and the steady-state voltage phasor diagram of this equation is illustrated in FIG. 11.

The superconducting cylindrical assembly described herein maintains a substantially constant field $\phi$. It is evident from the above equation that with a constant field the terminal voltage $V_T$ will drop as the output current increases. This variation in terminal voltage makes no difference, if the stored field superconductor is used in a generator that produces electricity that ultimately is converted into direct current. In those applications where a constant voltage is necessary, the frequency of the output current can be varied to compensate for changes in the load.

In generator use where constant terminal voltage in the presence of load variation is critical, the armature reactance could be varied by a variation of the stator permeability, and/or the armature turns density. There are many generator and motor applications where the load remains constant, and no variation of the field is necessary to maintain constant terminal voltage.

Thus, although the best modes contemplated for carrying out the present invention have been herein shown and described, it will be apparent that modification and variation may be made without departing from what is regarded to be the subject of the invention.

What is claimed is:

1. Apparatus for providing a magnetic field in a superconducting, rotating electrical machine, said machine having an axis of rotation, comprising:
   (a) a housing for supporting the electrical machine;
   (b) an elongate flux trapping cylindrical means fabricated of superconductive material and mounted in the housing for trapping a magnetic field therein, said superconductive material in the cylindrical means having an annular cross section normal to the axis of rotation of the machine and a unitary length along the axis of rotation substantially equal to the length of the machine, said trapped magnetic field forming a magnetic circuit with an armature winding mounted in the housing;
   (c) means within the housing and attached thereto for generating a magnetic pattern field in the cylindrical means; and
   (d) means within the housing and attached thereto for cooling the cylindrical means so that a magnetic field can be trapped in the cylindrical means from the pattern field, said trapped magnetic field thereby providing a magnetic field in the machine.

2. An apparatus as in claim 1 in which the rotating electrical machine is a generator for converting mechanical power into electrical current, said electrical current being induced in the armature winding by the magnetic field trapped in the cylindrical means.

3. An apparatus as in claim 1 in which the rotating electrical machine is a motor for converting electrical current into mechanical power.

4. An apparatus as in claim 1 in which the cylinder means is fabricated from an A-15, bets-tungsten structure, superconductor.

5. An apparatus as in claim 1 including a rotor mounted in the housing for rotation with respect thereto and in which the magnetic field coupled to the armature winding within the housing is generated exclusively by the magnetic field trapped in the rotor.

6. An apparatus for providing a magnetic field for a stationary armature winding of a superconducting, rotating electrical machine, comprising:
   (a) a rotor mounted for rotation in an electrical machine and having a cylindrical assembly adapted for trapping a magnetic field therein, said cylindrical assembly being fixedly connected to the rotor and having alternating layers of superconductive material and thermally and electrically conductive material, each layer of said assembly being co-axial, fixedly connected to the assembly, and having a cylindrical shape;
   (b) a pattern coil located within the rotor, fixedly connected thereto, and rotated therewith, said pattern coil being adapted for generating a magnetic pattern field in the cylindrical assembly; and
   (c) means connected to the rotor for cooling the cylindrical assembly so that a magnetic field can be trapped in the cylindrical assembly from the pattern field, the magnetic field when trapped in the cylindrical assembly thereby providing a magnetic field for a stationary armature winding and forming a magnetic circuit between the cylindrical assembly and the armature winding.

7. An apparatus as in claim 6 in which the pattern coil is cryogenically cooled and is a superconducting electromagnet.

8. An apparatus as in claim 6 including a pulse generator electrically connected to the pattern coil within the rotor for exciting said coil and thereby generating a magnetic pattern field in the cylindrical assembly.

9. An apparatus as in claim 6 in which the layers of superconductive material in the cylindrical assembly are segmented into a plurality of elements that form a grid to reduce electric currents induced therein from the armature winding.

10. An apparatus for providing a magnetic field in a stationary armature winding of a superconducting, rotating electrical machine, comprising:
    (a) a rotor mounted for rotation in an electrical machine and having a cylindrical assembly adapted for trapping a magnetic field therein, said cylindrical assembly being fixedly connected to the rotor and having alternating layers of superconductive material and thermally and electrically conductive material, each layer of said assembly being co-axial, fixedly connected to the assembly, and having a cylindrical shape;
    (b) a stationary armature winding fixedly connected to the machine;
    (c) means connected to the armature winding for energizing selected windings in the armature winding and for generating a magnetic pattern field in the cylindrical assembly; and
    (d) means connected to the rotor for cooling the cylindrical assembly so that a magnetic field can be trapped in the cylindrical assembly from the pattern field, the magnetic field when trapped in the cylindrical assembly thereby providing a magnetic field in the armature winding and forming a magnetic circuit between the cylindrical assembly and the armature winding.

11. An apparatus as in claim 10 in which the energizing means generates the pattern field in the cylindrical assembly while the rotor is stationary, said energizing means being electrically connected to the armature winding.

12. An apparatus as in claim 10 in which the energizing means includes means for generating the pattern field in the cylindrical assembly while the rotor is in motion, said energizing means being electrically connected to the armature winding.

13. An apparatus for providing a magnetic field in a superconducting, rotating electrical machine, comprising:
    (a) a plurality of co-axial, overlying, thermally and electrically conductive cylinders; and
    (b) a plurality of co-axial, overlying, superconductive cylinders located in alternating relationship with the thermally and electrically conductive cylinders and fixedly connected thereto, said thermally and electrically conductive cylinders and said superconductive cylinders forming a unitary cylindrical assembly, the superconductive cylinders beying adapted for trapping a magnetic field therein and for forming a magnetic circuit with an armature winding in the machine, thereby providing a magnetic field for said machine.

14. An apparatus as in claim 13 in which the cylinders of superconductive material are segmented into a plurality of elements that form a grid to reduce currents induced therein from the armature winding.

15. An apparatus as in claim 13 in which the superconductive cylinders are adapted for cooling by liquid helium flowing within the thermally and electrically conductive cylinders.

16. An apparatus as in claim 13 in which the thermally and electrically conductive cylinders include a plurality of heaters for warming the superconductive conductive cylinders to normal conductivity.

17. An apparatus as in claim 13 in which the thermally and electrically conductive cylinders are connected together through the thermally and electrically conductive material.

18. An apparatus as in claim 18 in which the plurality of superconductive and thermally and electrically conductive cylinders is a rotor for a rotating electrical machine, the cylinders are adapted for removal from the machine and for trapping a magnetic field therein exterior of the machine.

19. An apparatus as in claim 13 in which the plurality of superconductive and thermally and electrically conductive cylinders is a stator for a rotating electrical machine, the cylinders are adapted for removal from the machine and for trapping a magnetic field therein exterior of the machine.

20. An apparatus for providing a magnetic field in an electrical generator having an armature winding, comprising:
    (a) a rigid, unitary cylindrical assembly adapted for trapping a magnetic field therein, said cylindrical assembly having alternating layers of superconductive material and thermally and electrically conductive material fixedly connected together, each layer of said assembly being co-axial and having a cylindrical shape;

(b) an armature winding for inducing an electrical output current from the trapped magnetic field in the cylindrical assembly; and (c) means connected to the cylindrical assembly and to the armature winding for mounting said assembly and said winding for relative rotation with respect to each other.

21. An apparatus as in claim 20 in which the armature winding rotates relative to the cylindrical assembly and the cylindrical assembly is located inside of the armature winding.

22. An apparatus as in claim 20 in which the armature winding rotates relative to the cylindrical assembly and the cylindrical assembly is located around the outside of the armature winding.

23. An apparatus as in claim 20 in which the cylindrical assembly rotates relative to the armature winding and the armature winding is located inside of the cylindrical assembly.

24. An apparatus as in claim 20 in which the cylindrical assembly rotates relative to the armature winding and the armature winding is located around the outside of the cylindrical assembly.

25. A method for providing a magnetic field in a superconducting, rotating electric generator having a rotor and an axis of rotation, comprising the steps of:

(a) generating a magnetic pattern field in a superconductive cylindrical assembly, said magnetic pattern field within the assembly being substantially normal to the axis of rotation of the generator;

(b) cryogenically cooling the cylindrical assembly in the pattern field;

(c) trapping a magnetic field in the superconductive cylindrical assembly from the pattern field, said magnetic field trapped in the cylindrical assembly being substantially normal to the axis of rotation of the generator; and (d) generating electrical power by relatively rotating the superconductive cylindrical assembly with the magnetic field trapped therein with respect to an armature winding in the electric generator and about the axis of rotation.

26. A method as in claim 25 including trapping a magnetic field normal to the axis of rotation in an electric generator and generating electrical power therewith.

27. A method as in claim 25 including generating the magnetic pattern field normal to the axis of rotation by pulsing a coil located in the rotor of the rotating electric generator.

28. A method as in claim 25 including generating the magnetic pattern field normal to the axis of rotation by pulsing selected coils in the armature winding of the electric generator.

29. A method as in claim 25 including inserting the superconductive cylindrical assembly into the electric generator after the magnetic field has been trapped in the superconductive cylindrical assembly.

30. A method for providing a magnetic field in a superconducting, rotating electrical motor having a rotor and an axis of rotation, comprising the steps of:

(a) generating a magnetic pattern field in a superconductive cylindrical assembly, said magnetic pattern field within the assembly being substantially normal to the axis of rotation of the motor;

(b) cryogenically cooling the cylindrical assembly in the magnetic pattern field;

(c) trapping a magnetic field in the superconductive cylindrical assembly from the pattern field, said magnetic field trapped in the cylindrical assembly being substantially normal to the axis of rotation of the motor; and (d) generating mechanical power by relatively rotating the superconductive cylindrical assembly with the magnetic field trapped therein with respect to an armature winding in the electrical motor and about the axis of rotation.

31. A method as in claim 30 including trapping a magnetic field normal to the axis of rotation in an electric motor and generating mechanical power therewith.

32. A method as in claim 30 including generating the magnetic pattern field normal to the axis of rotation by pulsing a coil located in the rotor of the electrical motor.

33. A method as in claim 30 including generating a magnetic pattern field normal to the axis of rotation by pulsing selected coils in the armature winding of the electrical motor.

34. A method as in claim 30 including inserting the superconductive cylindrical assembly into the electric motor after the magnetic field has been trapped in the superconductive cylindrical assembly.

35. A method for trapping a magnetic field in the electrical machine, having an axis of rotation, comprising the steps of:

(a) generating in an electrical machine a multipole magnetic pattern field in a superconductive cylindrical assembly, said cylindrical assembly being located in the electrical machine and having a temperature above its transition temperature, said magnetic pattern field within the assembly being substantially normal to the axis of rotation of the generator;

(b) thereafter cooling the superconductive cylindrical assembly in the pattern field to a temperature below its transition temperature;

(c) thereafter removing the multipole pattern field from the electrical machine so that a magnetic field remains trapped in the superconductive cylindrical assembly, said magnetic field trapped in the cylindrical assembly being substantially normal to the axis of rotation of the machine; and (d) relatively rotating the cylindrical assembly with the trapped magnetic field therein with respect to an armature winding in the electrical machine and about the axis of rotation so that power is produced thereby.

* * * * *